March 7, 1933.  S. P. BURKE  1,899,926
FURNACE
Original Filed Jan. 29, 1930  2 Sheets-Sheet 1
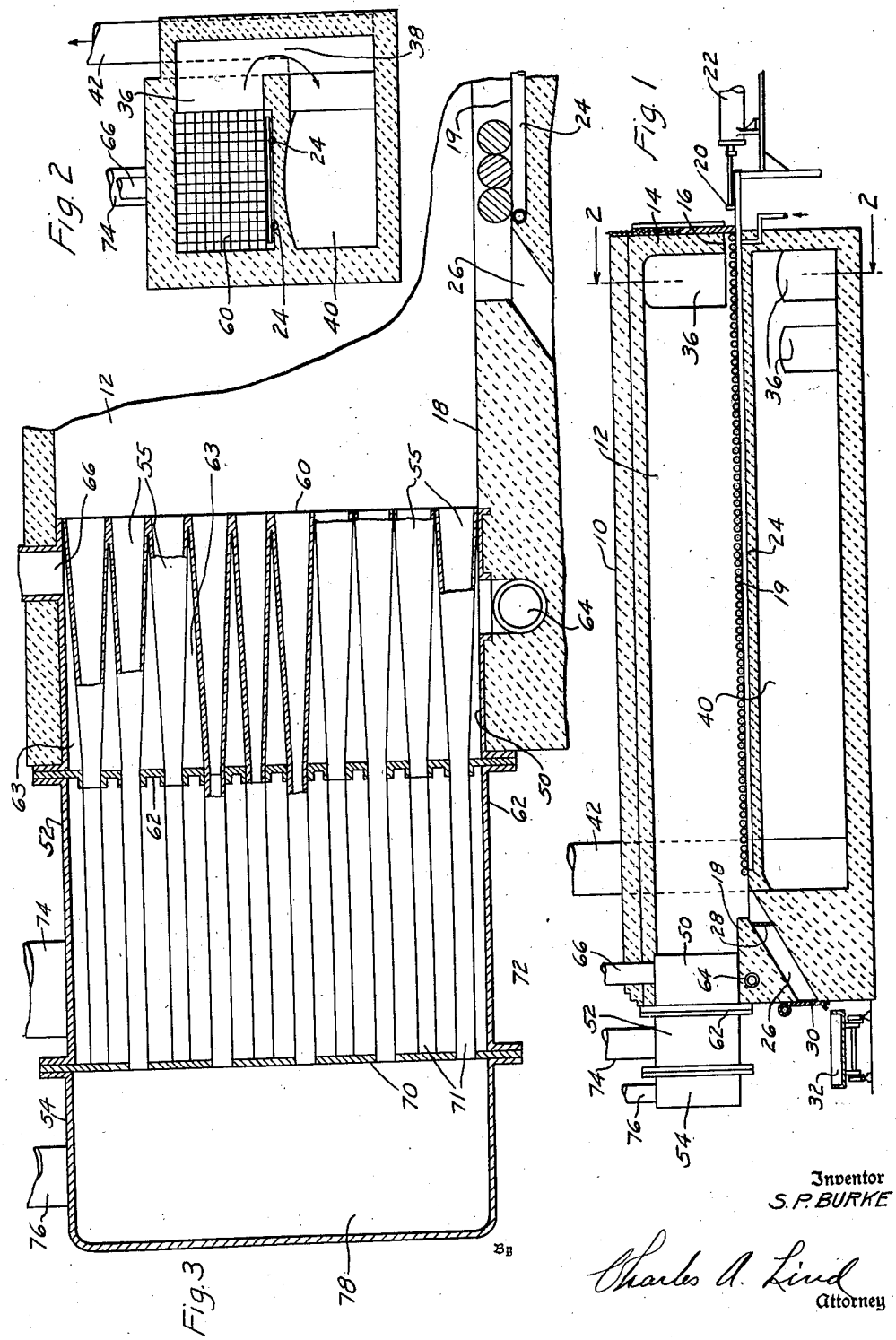
Inventor
S. P. BURKE
Charles A. Lind
Attorney March 7, 1933.  S. P. BURKE  1,899,926
FURNACE
Original Filed Jan. 29, 1930  2 Sheets-Sheet 2
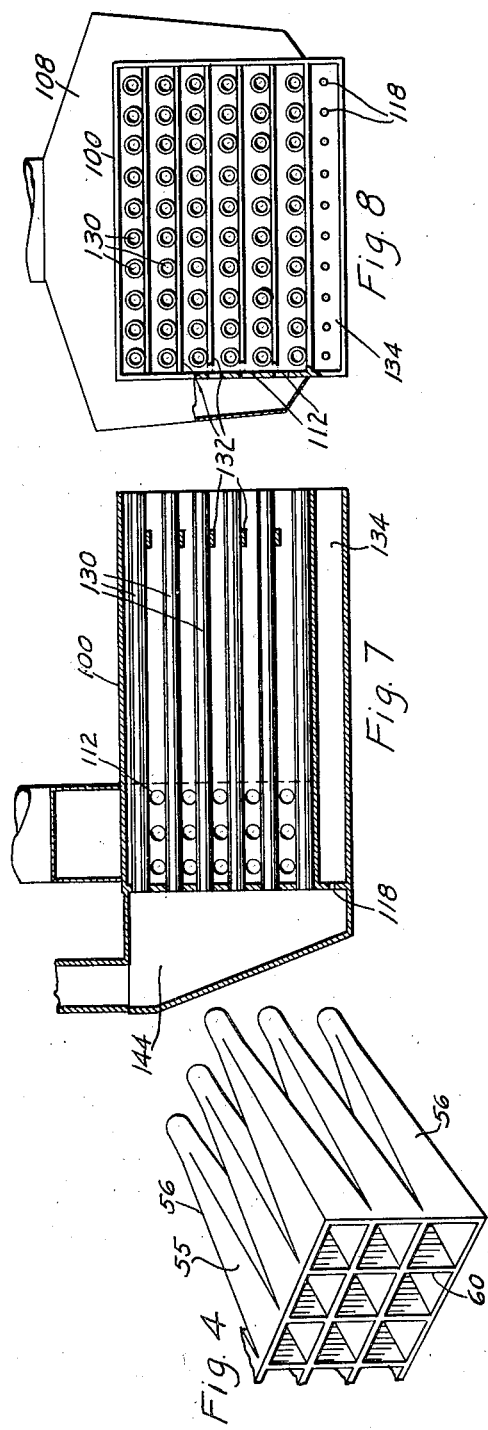
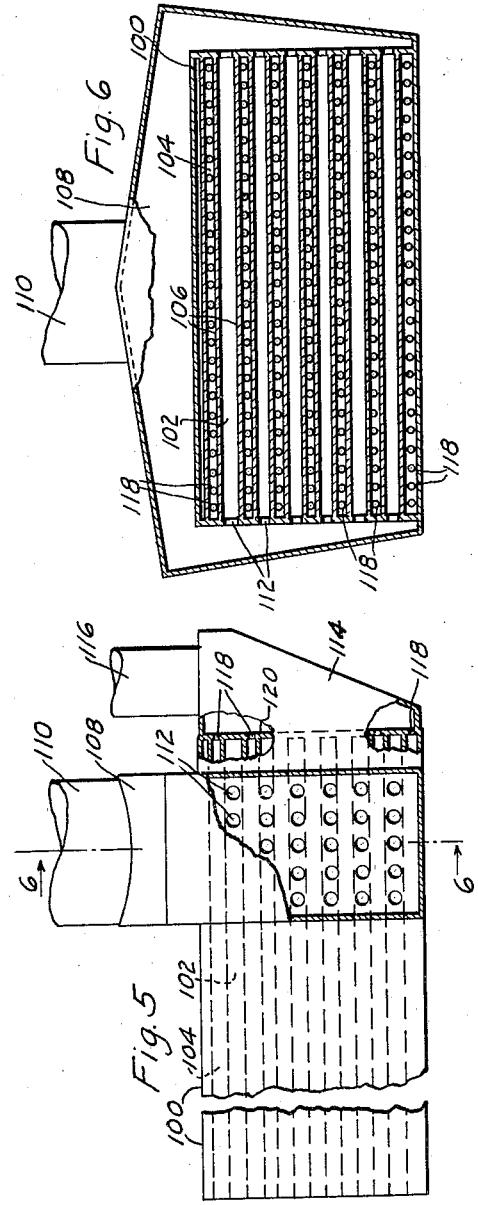
Inventor
S. P. BURKE
By Charles A. Lind
Attorney Patented Mar. 7, 1933

1,899,926

UNITED STATES PATENT OFFICE

STEPHEN P. BURKE, OF MORGANTOWN, WEST VIRGINIA, ASSIGNOR TO SURFACE COMBUSTION CORPORATION, OF TOLEDO, OHIO, A CORPORATION OF NEW YORK

FURNACE

Original application filed January 29, 1930, Serial No. 424,280. Divided and this application filed June 13, 1932. Serial No. 616,874.

This invention relates to improvements in gas-fired furnaces and is a division of my application, Serial No. 424,280 filed January 29, 1930.

In heating operations where a gaseous fuel is used, the air and gas are generally premixed, and the mixture is then introduced into the furnace. Such mixtures burn very rapidly and produce maximum temperature in close proximity to the point of introduction of the mixture into the furnace and, moreover produce a substantially nonluminous flame which transfers its heat to the work partly by direct contact therewith and partly by conduction and convection to the furnace walls thus rendering the latter incandescent, such heat then being radiated to the material.

Steel, when heated to high temperatures in an atmosphere of products of combustion, is invariably oxidized or scaled notwithstanding that the fuel may have been burned with a deficiency of air to produce a so-called reducing atmosphere; such scaling being due to the presence of carbon dioxide and water vapor in such atmosphere. Furthermore, when raw fuel gas is introduced into the usual gas-fired furnace, it quickly mixes with the products of combustion and the resulting atmosphere has substantially the same effect as when the combustible mixture itself contains a deficiency of air.

The present invention has among its objects to provide an improved gas-fired furnace of such form and construction that a flame of substantially the same cross sectional area as the furnace may be produced and caused to persist throughout the full length of the furnace whereby to more efficiently utilize the heating value of the fuel gas, and withal to provide ways and means for protecting the material being heated from harmful or undesirable gases.

According to the present invention the fuel gas and air for combustion are introduced into the furnace chamber as separate streams from one end thereof, the streams being caused to flow in contacting relation and without substantial turbulence lengthwise of said chamber whereby combustion is substantially dependent upon the interdiffusion of the air and gas with the consequent production of a long flame. The said streams of gas and air may enter the chamber either in parallel slots, or in parallel or concentric tubular ducts, and the velocities of the respective gas and air streams are preferably substantially equal as they enter the furnace, although considerable variation may occur in the relative velocities of the gas or air streams without creating substantial turbulence in the combustion zone. Mixing of the gas and air occurs within the furnace substantially by diffusion, so that at the various zones or surfaces of contact of the gas and air, conditions are favorable for combustion, but not elsewhere.

When hydrocarbons are present in the fuel gas layers, the high temperature developed as combustion proceeds, causes a cracking or decomposition of portions of the hydrocarbons, resulting in the liberation of finely divided incandescent carbon particles which travel along within a viscous gaseous envelope of hot combustion gases. These gases of combustion materially retard the further interdiffusion of gas and air with consequent retardation of combustion and assist in the production of a long flame in the furnace. The zone of combustion may be made substantially coextensive with the moving bodies of gas and air within the combustion chamber by suitable adjustment of the thickness of the layers of gas and air used; and such bodies will be highly luminous due to the incandescent carbon in suspension therein. The major portion of the heat required for bringing the work to the desired temperature consists of heat radiated directly from the luminous flame, additional heat being reradiated to the work from the incandescent furnace walls and otherwise transferred to the work by direct contact of the hot gases.

Since the fuel gas and air and the resulting products of combustion pass through the furnace without objectionable turbulence and substantially in stream-line flow, it is possible to effectively regulate the character of the atmosphere surrounding the material being heated. For example, if the lowermost duct of the burner is made to serve as a gas duct, and work to be heated may be blanketed with the gas issuing from such duct and thus be protected from undesirable gases. This gas blanketing effect will be most readily obtainable at the gas entrance end of the furnace; and the duct supplying the gas blanket to the work should be of sufficient thickness to suitably protect the work remote from the gas entrance end of the furnace.

Referring to the drawings, Fig. 1 is a vertical section through a furnace embodying the invention.

Fig. 2 is a transverse cross section through the furnace along the line 2—2 of Fig. 1.

Fig. 3 is an enlarged sectional view of the burner end of the furnace.

Fig. 4 is a fragmentary perspective view of certain details of the burner shown in Fig. 3.

Fig. 5 is a side elevation of a modified form of burner construction with parts broken away.

Fig. 6 is a vertical section taken along the line 6—6 of Fig. 5.

Fig. 7 is a longitudinal vertical section of a modified form of burner, and

Fig. 8 is a transverse vertical section of the burner shown in Fig. 7.

In the drawings, numeral 10 designates a furnace having an elongated combined heating and combustion chamber 12 of substantially uniform cross section throughout its length and terminating at one end in a wall 14 provided with a door-controlled opening 16, and at the other end in an opening wherein is positioned a burner, the floor 18 of the burner opening being preferably disposed above the floor 19 of the chamber 12 a distance approximately equal to the height of the work to be heated.

The work may be pushed through the furnace by a pusher device comprising a pusher head 20 operated by an hydraulic cylinder 22, the work being supported on water-cooled skid rails 24. An inclined chute 26 at the burner end of the furnace permits discharge of the heated work, said chute being provided with trap doors 28 and 30 to prevent inflow of air into the furnace chamber. The work discharged from the chute may be received on a conveyor 32. At that end of the chamber 12 most remote from the burner is an exhaust port for the waste gases, said port being in communication with a stack 42 by way of flues 36 and 40.

Referring now more particularly to Figs. 1 to 4, there is provided a burner assembly comprising three connected casing sections 50, 52, 54, forming, respectively, a cooling chamber 63, an air supply chamber 72, and a gas supply chamber 78, separated by partitions 62 and 70, and conduits 64, 74 and 76 for supplying fluids.

Mounted within the casing 50 is a plurality of tubular members 55 having sloping side walls 56, the tubular members being in the form of spaced ducts so placed as to merge into each other at their larger end margins as indicated at 60, the tubes being made of heat resistant alloy. The small end of each tube 55 is supported by the partition 62 in a fluid-tight manner. It will therefore be seen that cooling fluid entering at 64 may circulate between the tubes, the fluid passing from the casing by way of conduit 66. Some of the tubes 55 serve as air conducting tubes and the others as gas conducting tubes. Those tubes which are to serve as gas conducting tubes are connected with the gas supply chamber 78 by pipes 71. It is preferred that all of the lowermost row of tubes 55 serve as gas conducting tubes in order that there may be flowed over the material to be heated a layer of gas for protecting the work from oxidation. It will be noted that the tubes 55 are all of the same size as regards cross sectional area. Since a greater volume of air than gas is required for complete combustion of the gas and since in accordance with the present invention the air and gas flow with substantially equal velocities, most of the tubes 55 will serve as air conducting tubes. Thus if one volume of gas requires eight volumes of air for complete combustion then out of nine tubes 55, eight of them would be air tubes. Thus, referring to Fig. 4, it can be assumed that the middle tube is the gas conducting tube and that the other eight tubes are air conducting tubes. The gas issuing from the central tube will therefore be completely surrounded by air issuing from the adjacent tubes.

Referring to the modified form of burner shown in Figs. 5 and 6, the burner assembly comprises a housing 100 divided into a plurality of superposed slots or compartments 102, 104, by means of a plurality of thin partitions 106 made of heat-resistant metal. An air header 108 surrounds the top and sides of the housing 100 adjacent its rear end and is connected by a conduit 110 with a source of air under pressure. The interior of the header 108 communicates with each of the slots 102 within the housing 100 through a plurality of apertures 112 arranged at each side of the latter. A gas distributing header 114,—in communication with a source of combustible gas under pressure through a conduit 116,—is in communication with the slots or ducts 104 through a series of apertures 118 disposed in a partition 120 at one end of the housing 100. Suitable valves (not shown) are provided in the air and gas conduits leading to the burner to provide for the independent regulation of the velocity pressure of each of these fluids. The arrangement of the apertures 112 and 118 respectively in the sides and end of the housing 100 provides for a uniform distribution of the respective fluids to the various slots or ducts 102 and 104.

In the modified form of burner shown in Figs. 7 and 8, a plurality of parallel spaced tubes 130 of heat-resistant metal extend longitudinally of the burner casing 100, the rear ends of the tubes opening into a suitable gas header 144. These tubes are suitably supported near their forward ends in superposed horizontal rows, by means of supporting members 132 of heat resistant metal. Air is introduced into the side of the burner casing adjacent the rear end thereof and around the tubes 130 by means of an air header 108 similar to the header 108 in Figs. 6 and 7. A separate horizontal duct or slot 134 is disposed below the bottom row of gas tubes 130, the rear end thereof being in communication with the gas header 144 through apertures 118 in the manner shown in Fig. 7.

In accordance with the present invention, a combustible hydrocarbon-containing gas such as natural gas or coke-oven gas is flowed at a predetermined velocity and pressure into the casing 54 from which it flows through the pipes 71 to such of the tubes 55 as are in communication with the said pipes. At the same time air under suitable pressure is flowed into the casing 52 from which it flows into such of the tubes 55 as are in communication therewith. By suitable regulation, the gas and air streams flow from the burner at substantially the same velocity. Mixing of the gas and air thereafter occurs substantially by interdiffusion only, and combustion proceeds progressively at the surfaces of the gas and air streams with the resultant production of a highly radiant flame.

As already stated, the lowermost row of tubes in the burner are preferably in communication with the gas header 78 to provide a flowing blanket of hydrocarbon gases over the work within the chamber 12, whereby to protect the work from substantial oxidation or scaling during heating.

Any slight turbulence occurring within the heating chamber due to flow of the gas past the work being heated, is insufficient to materially affect the character of the flame propagation or the effectiveness of the heat-transfer.

While gas and air velocities in the neighborhood of 10 feet per second may be successfully employed in accordance with the invention, somewhat lower velocities are preferred.

By the present invention, a high heating efficiency is obtained together with a uniform heating of the work, while oxidation normally accompanying such heating is greatly reduced, and scale formation is substantially prevented.

While the invention has been described in connection with a furnace adapted to receive the work at one end and to discharge it at its other end, it will of course be readily appreciated that the invention is not limited in its application to such type of furnace.

What I claim is:

1. A furnace comprising in combination an elongate heating chamber substantially uniform in cross-section throughout its length, a burner disposed at one end of the said chamber and being of substantially the same cross-sectional area as the chamber at the said end, the burner having a plurality of parallel ducts arranged in superposed rows, all of the ducts in the lowermost row communicating with a common source of gas, and the remaining ducts communicating some with a source of air and some with a source of combustible gas in such a way that the air and combustible gas will be discharged in alternate streams.

2. A furnace comprising in combination an elongate heating chamber having a streamline inner surface, a burner disposed at one end of the said chamber, the said burner comprising a plurality of superposed ducts, means for flowing combustible gas into certain of the ducts, and independent means for flowing air into the remaining ducts, the cross-sectional area of the burner being substantially the same as the cross-sectional area of the heating chamber.

3. A furnace comprising in combination an elongate heating chamber, a burner at one end of the chamber and being of substantially the same cross-sectional area as the chamber, means for supporting the work to be heated at a level below the burner, said burner comprising a plurality of parallel contiguous ducts, some of the ducts communicating with a source of combustible gas, and others of said ducts communicating with a source of air, the arrangement being such that the gas-carrying ducts will be bounded by air ducts.

4. A furnace comprising in combination an elongated heating chamber, a burner at one end of the chamber and being substantially the same cross-sectional area as the chamber, means for supporting the work to be heated at a level below the burner, said burner comprising a plurality of parallel contiguous ducts, means connecting some of the ducts with a source of combustible gas, means connecting others of said ducts with a source of air, the arrangement being such that the gas-carrying ducts will be bounded by air ducts, a lower row of ducts extending across the width of the chamber, and means connecting all of the last-named ducts with a common source of gas.

5. A furnace comprising in combination an elongate heating chamber, a burner disposed at one end of the said chamber, the burner having a plurality of parallel tubular members each having an end thereof enlarged to cooperate with adjacent like ends to form a thin walled grille defining passageways, the total cross-section of the passageways being approximately the same as the total cross-section of the chamber, a conduit connecting certain of said members with a source of fuel gas, and a conduit connecting other of the said members with a source of air, the gas passages being bounded by air passages.

6. A furnace as defined in claim 5, in which the said burner includes a bottom transverse row of passages all of which are in communication with a common source of gas.

7. A furnace as defined in claim 5, in which said burner includes a jacket for confining a cooling fluid around parts of said tubular members adjacent said grille.

8. A furnace comprising in combination an elongate heating chamber substantially free of abrupt changes in shape or size, a burner disposed at one end of the chamber and being of substantially the same size as the said end of the chamber, the said burner comprising a group of spaced ducts, means for feeding gas to the said ducts, and means for feeding air to the spaces between adjacent ducts, the combined cross-sectional area of the duct orifices bearing such a relationship to the combined cross-sectional area of the said spaces that gas and air in proportion suitable for complete combustion may be delivered into the said chamber at approximately equal velocities.

9. A furnace comprising in combination an elongate heating chamber substantially free of abrupt changes in shape and size, a burner disposed at one end of the chamber and being of substantially the same size as the said end, the said burner comprising a group of superposed ducts, means for connecting alternate ducts with a source of air, and means for connecting the remaining ducts with a source of combustible gas, the said ducts being so shaped as to permit streamline flow into the chamber of the gas and air.

In testimony whereof I affix my signature.

STEPHEN P. BURKE.